United States Patent
Lee et al.

(10) Patent No.: US 10,462,856 B2
(45) Date of Patent: *Oct. 29, 2019

(54) HIGH FREQUENCY HEATING APPARATUS

(71) Applicant: SAMSUNG CORNING PRECISION MATERIALS CO., LTD., Gyeongsangbuk-do (KR)

(72) Inventors: Hoikwan Lee, ChungCheongNam-Do (KR); Kyungmin Yoon, ChungCheongNam-Do (KR); Seo-Yeong Cho, ChungCheongNam-Do (KR)

(73) Assignee: Corning Precision Materials Co., Ltd., Asan-si, Chungcheongnam-do (KR)

(*) Notice: Subject to any disclaimer, the term of this patent is extended or adjusted under 35 U.S.C. 154(b) by 715 days.

This patent is subject to a terminal disclaimer.

(21) Appl. No.: 13/786,240

(22) Filed: Mar. 5, 2013

(65) Prior Publication Data
US 2013/0233848 A1    Sep. 12, 2013

(30) Foreign Application Priority Data
Mar. 6, 2012    (KR) .................. 10-2012-0022640

(51) Int. Cl.
*H05B 6/64*    (2006.01)
*H05B 6/70*    (2006.01)
(Continued)

(52) U.S. Cl.
CPC .............. *H05B 6/64* (2013.01); *C03B 29/08* (2013.01); *F27B 9/36* (2013.01); *F27D 11/12* (2013.01);
(Continued)

(58) Field of Classification Search
CPC ....... C03C 23/0065; C03C 29/08; H05B 6/64; H05B 6/78; H05B 6/80; H05B 6/70; F27D 11/12; F27D 2099/0026; F27D 99/0006
(Continued)

(56) References Cited

U.S. PATENT DOCUMENTS 4,631,380 A * 12/1986 Tran ............................ 219/697
4,839,485 A    6/1989 Koch et al.
(Continued)

FOREIGN PATENT DOCUMENTS

CN    101282600 A    10/2008
CN    201639808 U    11/2010
(Continued)

OTHER PUBLICATIONS

U.S. Final Office Action issued in U.S. Appl. No. 13/786,094 dated Mar. 22, 2017.
(Continued)

*Primary Examiner* — Ibrahime A Abraham
*Assistant Examiner* — Frederick F Calvetti
(74) *Attorney, Agent, or Firm* — McDermott Will & Emery LLP (57) ABSTRACT

A high frequency heating apparatus which heats a substrate by applying high frequency waves thereto. The high frequency heating apparatus includes a high frequency generator which generates high frequency to heat the substrate. The distance from the substrate to the high frequency generator is $n/2*\lambda$, where n is a natural number ranging from 1 to 6, and $\lambda$ is the wavelength of the high frequency that is generated by the high frequency generator.

18 Claims, 9 Drawing Sheets

(51) Int. Cl.
*H05B 6/78* (2006.01)
*C03B 29/08* (2006.01)
*F27B 9/36* (2006.01)
*F27D 11/12* (2006.01)
*F27D 99/00* (2010.01)

(52) U.S. Cl.
CPC .......... *F27D 99/0006* (2013.01); *H05B 6/70* (2013.01); *H05B 6/78* (2013.01); *F27D 2099/0026* (2013.01)

(58) Field of Classification Search
USPC ........ 118/641, 642; 219/635, 638, 647, 653, 219/654, 672, 676
See application file for complete search history.

(56) References Cited

U.S. PATENT DOCUMENTS

| | | | | |
|---|---|---|---|---|
| 5,323,024 | A * | 6/1994 | Adams | 257/80 |
| 5,961,870 | A * | 10/1999 | Hogan | 219/679 |
| 5,977,529 | A | 11/1999 | Willert-Porada et al. | |
| 6,172,346 | B1 * | 1/2001 | Wroe | 219/681 |
| 7,474,273 | B1 * | 1/2009 | Pavliscak | H01Q 1/366 343/754 |
| 7,638,780 | B2 * | 12/2009 | Kilburn et al. | 250/492.1 |
| 7,719,471 | B1 | 5/2010 | Pavliscak et al. | |
| 9,221,714 | B2 * | 12/2015 | Lee | H05B 6/78 |
| 9,540,279 | B2 * | 1/2017 | Folgar | C03C 10/0027 |
| 2003/0233846 | A1 * | 12/2003 | Boaz | 65/114 |
| 2006/0124613 | A1 * | 6/2006 | Kumar et al. | 219/121.43 |
| 2007/0231500 | A1 * | 10/2007 | Rakotoarison | 427/462 |
| 2008/0203883 | A1 * | 8/2008 | Takada et al. | 313/153 |
| 2009/0050941 | A1 * | 2/2009 | Yamazaki et al. | 257/255 |
| 2010/0096564 | A1 | 4/2010 | Yang et al. | |
| 2011/0116821 | A1 | 5/2011 | Tanaka et al. | |
| 2011/0227199 | A1 * | 9/2011 | Hata | H01L 21/02381 257/616 |
| 2011/0260621 | A1 * | 10/2011 | Sortais et al. | 315/111.41 |
| 2011/0266717 | A1 * | 11/2011 | Nehls et al. | 264/413 |
| 2012/0049738 | A1 * | 3/2012 | Fujita et al. | 315/111.81 |

FOREIGN PATENT DOCUMENTS

| | | |
|---|---|---|
| DE | 3806816 A1 | 11/1988 |
| DE | 19515342 A1 | 10/1996 |
| EP | 1947064 A1 | 7/2008 |
| JP | 11-504153 A | 4/1999 |

OTHER PUBLICATIONS

U.S. Office Action issued in U.S. Appl. No. 13/786,094, dated Dec. 14, 2017, 19 pages.

U.S. Final Office Action issued in U.S. Appl. No. 13/786,094 dated Jul. 11, 2018.

* cited by examiner

HIGH FREQUENCY HEATING APPARATUS

CROSS REFERENCE TO RELATED APPLICATION

The present application claims priority from Korean Patent Application Number 10-2012-0022640 filed on Mar. 6, 2012, the entire contents of which application are incorporated herein for all purposes by this reference.

BACKGROUND OF THE INVENTION

Field of the Invention

The present invention relates to a high frequency heating apparatus, and more particularly, to a high frequency heating apparatus which heats a substrate by applying high frequency waves thereto.

Description of Related Art

The use of glass materials in a variety of industrial fields, specifically, as a cover for a photovoltaic cell, a flat display such as a thin-film transistor liquid crystal display (TFT-LCD), a plasma display panel (PDP) or an organic electroluminescent (EL) device, a variety of mobile electronic devices, and the like, is rapidly increasing. Accordingly, glass materials are required to have lightweight and a thin profile.

However, the trend in glass materials towards a light and thin profile leads to a problem of fragility due to its high brittleness. Accordingly, a variety of tempering methods is being studied in order to improve the durability of glass.

Glass tempering technologies of the related art include chemical strengthening technology that uses an ion exchange between the glass surface and a water solution (molten salt) and thermal strengthening technology that includes heat treatment on glass.

The chemical strengthening technology has the drawbacks of poor usability regarding process time necessary for the ion exchange between the glass surface and a water solution, the size of the glass, recycling of the water solution (contamination and concentration control), and the like.

In contrast, the thermal strengthening technology strengthens glass by increasing the temperature of a plate glass and quenching it while moving the plate glass in a hot horizontal furnace. A variety of methods for applying this technology in the industry are underway since heating using high frequency waves has an advantage in that the heat treatment effects are enhanced due to volume heating and rapid heating is enabled.

However, in the case of heat-treating a plate glass having a large size by applying the high frequency technology of the related art, the use of a single high frequency generator is disadvantageous in that control over electric field distribution inside a chamber is difficult and the temperature growth rate is low. Although the use of a plurality of high frequency generators increases the temperature growth rate to a certain degree, concentration in electric fields due to interference between the high frequency generators leads to localized heating in the glass and the decreased heating efficiency, which is problematic.

Figure 1A:
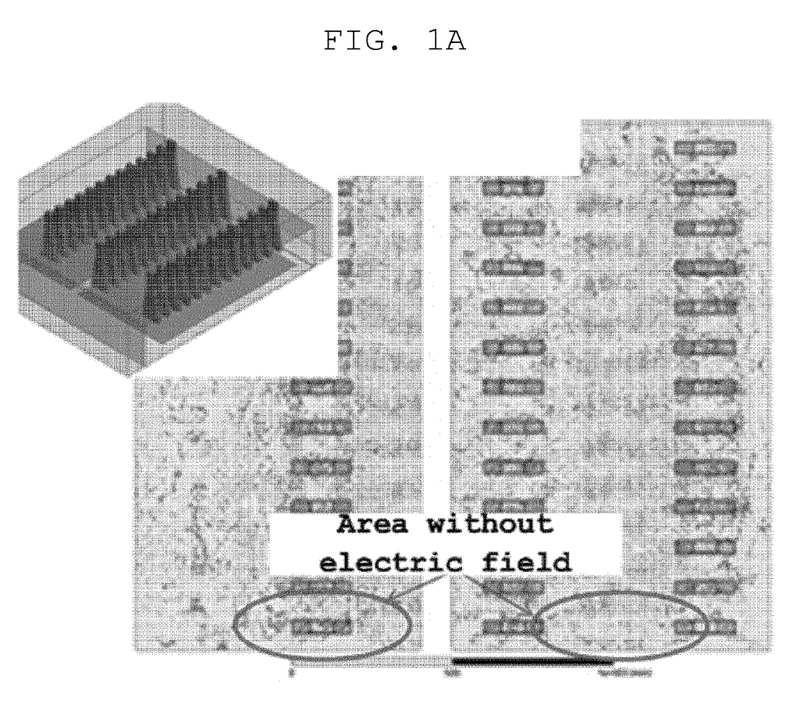
FIG. 1A and FIG. 1B are pictures of electric field distribution analysis and temperature distribution analysis of a plate glass that are measured after heat-treating the plate glass using a high frequency heating apparatus having a plurality of high frequency generators of the related art.
Figure 1B:
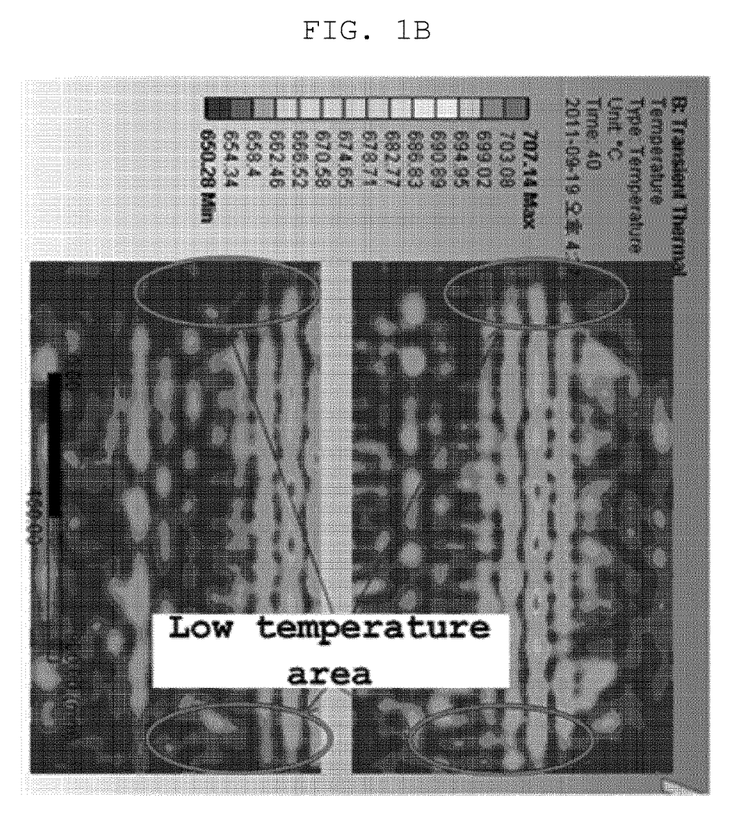

FIG. 1A and FIG. 1B are pictures of electric field distribution analysis and temperature distribution analysis of a plate glass that are measured after heat-treating the plate glass using a high frequency heating apparatus having a plurality of high frequency generators of the related art. In FIG. 1A, the apricot area represents the portion where no electric field is formed. In FIG. 1B, the blue area represents a low temperature, and the red area represents a high temperature. It can be appreciated that the corner areas of the heat-treated plate glass are not heated since no electric fields are formed in these areas. In addition, hot spots are formed in localized areas of the plate glass due to the interference of the electric fields.

Accordingly, in the case of high frequency heating using a single high frequency generator, the problem is that the temperature growth rate is low. In the case of high frequency heating using a plurality of high frequency generators, the problems are that localized heating occurs due to the interference between high frequency waves generated by the high frequency generators and the concentration in electric field although the temperature growth rate is improved to a certain degree.

The information disclosed in the Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a high frequency heating apparatus which can rapidly heat a substrate and prevent localized heating.

In an aspect of the present invention, provided is a high frequency heating apparatus including a high frequency generator which generates high frequency to heat a substrate. The distance from the substrate to the high frequency generator is $n/2*\lambda$, where n is a natural number ranging from 1 to 6, and $\lambda$ is the wavelength of the high frequency that is generated by the high frequency generator.

In another aspect of the present invention, provided is a high frequency heating apparatus including a plurality of high frequency generators which generate high frequency to heat a substrate. The plurality of high frequency generators are arranged at distances expressed by $n/2*\lambda$, where n is a natural number ranging from 1 to 12, and $\lambda$ is the wavelength of the high frequency that is generated by the plurality of high frequency generators.

In an exemplary embodiment, the high frequency heating apparatus may also include a reflector which reflects the high frequency generated by the high frequency generator toward the substrate.

The reflector may include a first reflecting portion which forms a partition between high frequency generators of the plurality of high frequency generators which are spaced apart from each other.

The reflector may include a second reflecting portion which is disposed on the left side and/or the right side of the high frequency generator.

The reflector may include a third reflecting portion which is disposed above and/or below the substrate, the main plane of the third reflecting portion facing the main plane of the substrate.

The reflector may have a plurality of holes.

According to embodiments of the invention, it is possible to increase the temperature growth rate of the substrate and improve the energy efficiency of the high frequency heating apparatus.

In addition, since the reflector reflects high frequency waves, it is possible to prevent high frequency waves generated by the individual high frequency generators from interfering with each other, thereby preventing the substrate from being locally heated by the concentrated electric fields and improving high frequency heating efficiency.

Furthermore, since uniform electric fields are formed over the entire area of the substrate, the entire area of the substrate can be uniformly heated.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to a high frequency heating apparatus according to the present invention of the present invention, embodiments of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

In addition, in the following description, a direction from the front to the rear is defined as the direction in which a substrate is carried, and a direction from left to right is defined as the direction that intersects the direction in which the substrate is carried.

Figure 2A:
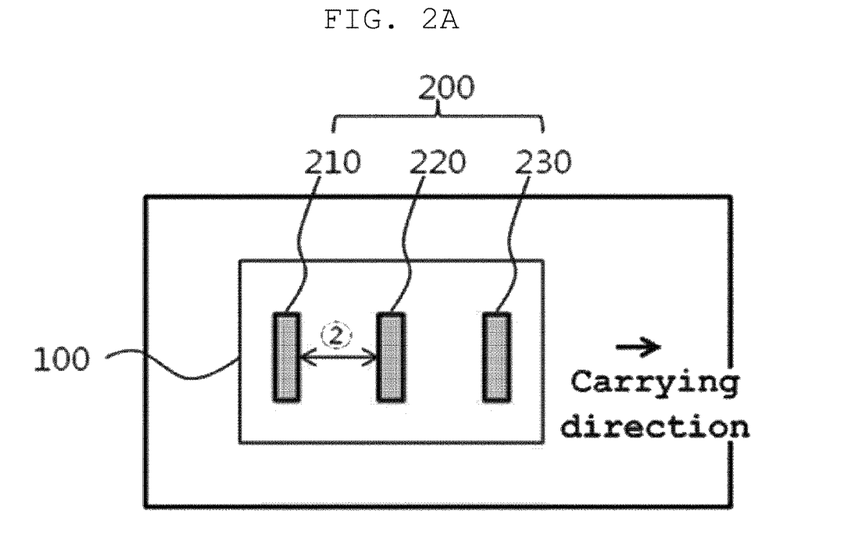
FIGS. 2A and 2B are a top plan view and a side elevation view schematically showing a high frequency heating apparatus according to an embodiment of the present invention.
Figure 2B:
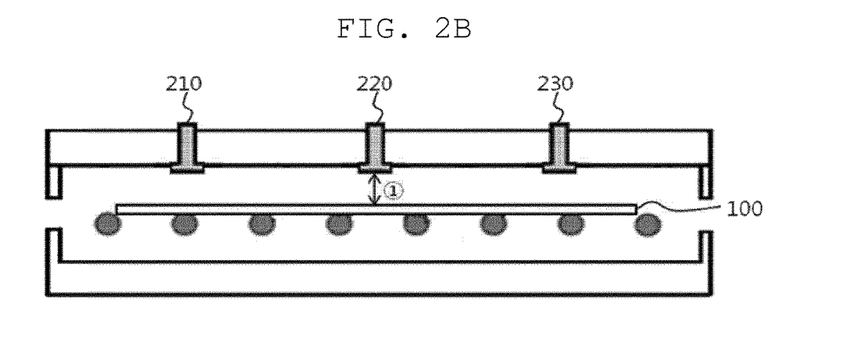

FIGS. 2A and 2B are a top plan view and a side elevation view schematically showing a high frequency heating apparatus according to an embodiment of the present invention.

Referring to FIG. 2, the high frequency heating apparatus according to this embodiment is characterized in that the distance from a high frequency generator to a substrate 100 is $n/2*\lambda$, where n is a natural number ranging from 1 to 6, and $\lambda$ is the wavelength of high frequency waves generated by the high frequency generator.

The high frequency generator 200 generates high frequency waves and vibrates ions inside the substrate 100 using the high frequency waves, thereby heating the substrate 100. The high frequency generator 200 can generate high frequency waves ranging from 0.98 GHz to 6.0 GHz, preferably, from 2.4 GHz to 5.8 GHz.

The substrate 100 is a substrate that is to be heated by the high frequency generator 200, and can be implemented as a plate glass that has a variety of thicknesses.

The distance ① from the high frequency generator 200 to the substrate 100 is $n/2*\lambda$, where n is a natural number ranging from 1 to 6. Preferably, the distance is $\lambda$.

In addition, in order to heat the substrate 100 to a high temperature or rapidly heat the substrate 100, the high frequency heating apparatus according to the present invention can include a plurality of high frequency generators 200 (210, 220, 230).

In this case, the distance between adjacent high frequency generators from among the high frequency generators 210, 220 and 230 is $n/2*\lambda$, where n is a natural number ranging from 1 to 12. Preferably, the distance is $2\lambda$.

Here, the plurality of high frequency generators 210, 220 and 230 can be arranged in one row in the direction from the front to the rear.

When the distance from the high frequency generator 200 to the substrate 100 and/or the distance between adjacent high frequency generators 210, 220 and 230 are controlled as described above, it is possible to improve the efficiency of high frequency heating of the substrate using the high frequency heating apparatus. In addition, when the plurality of high frequency generators 210, 220 and 230 are provided, it is possible to prevent high frequency waves generated by the individual high frequency generators from interfering with each other, thereby preventing the substrate from being locally heated due to concentration in electric fields.

Figure 3A:
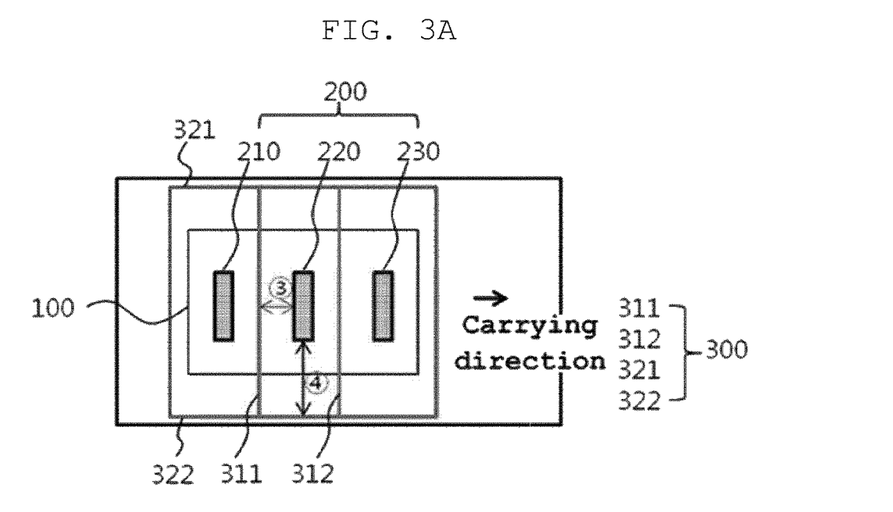
FIGS. 3A and 3B are a top plan view and a side elevation view schematically showing a high frequency heating apparatus according to another embodiment of the present invention.
Figure 3B:
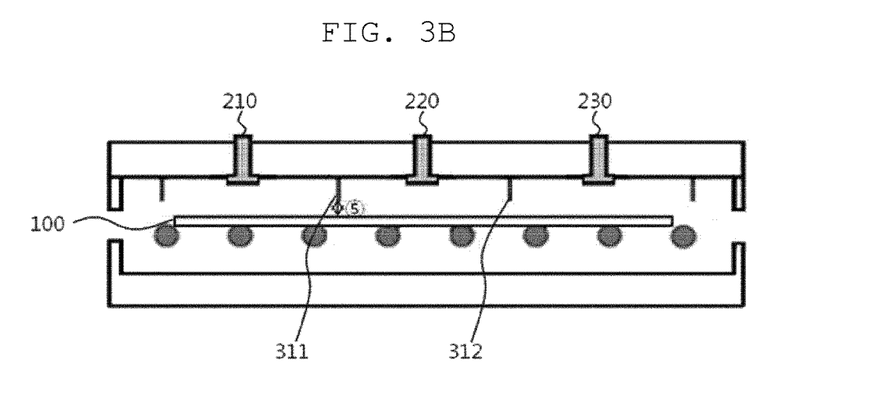
Figure 4:
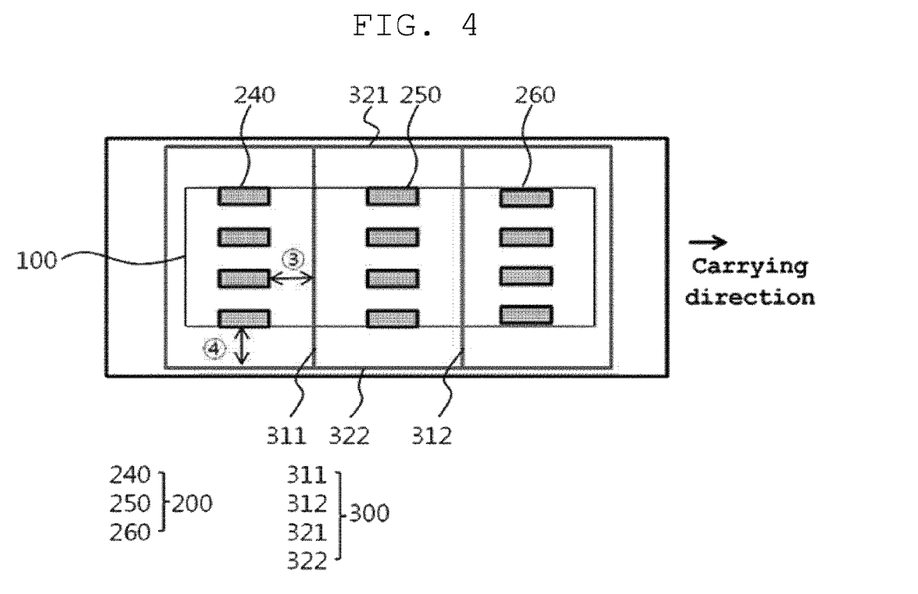
FIG. 4 is a schematic top plan view showing a high frequency heating apparatus according to a further embodiment of the present invention.

FIGS. 3A and 3B are a top plan view and a side elevation view schematically showing a high frequency heating apparatus according to another embodiment of the present invention, and FIG. 4 is a schematic top plan view showing a high frequency heating apparatus according to a further embodiment of the present invention.

Referring to FIG. 3A, FIG. 3B and FIG. 4, the high frequency heating apparatus according to the present invention can also include a reflector 300 which reflects high frequency waves generated by the high frequency generator toward the substrate.

The reflector 300 can be made of a conductive metal that can reflect high frequency waves.

The reflector 300 can be disposed such that it surrounds the high frequency generator 200 from the front and rear and from left and ride sides, or be disposed at corresponding positions above and below the substrate 100. When the reflector 300 is disposed in this fashion, it is possible to more efficiently reflect high frequency waves generated by the high frequency generator 200.

Since the reflector 300 creates multiple scattering by reflecting high frequency waves generated by the high frequency generator 200 toward the substrate 100, it is possible to uniformly heat the entire area of the substrate 100 including the corners by forming uniform electric fields over the entire area of the substrate 100. In addition, it is possible to increase the temperature growth rate of the substrate 100 and improve the energy efficiency of the high frequency heating apparatus.

In addition, when the high frequency heating apparatus according to the present invention includes the plurality of high frequency generators, the reflector 300 can partition the plurality of high frequency generators 210, 220 and 230 into high frequency generator groups each including at least one high frequency generator.

The reflector 300 can include first reflecting portions 311 and 312 which form partitions between the high frequency generators 210, 220 and 230 which are spaced apart from each other.

Here, the first reflecting portions 311 and 312 can form the partitions between the high frequency generators 210, 220 and 230 which are spaced apart from each other in the direction from the front to the rear. The first reflecting portions 311 and 312 can be configured such that they extend in the direction from left to right.

In this case, in order to efficiently prevent any interference between high frequency waves generated by the individual high frequency generators 210, 220 and 230, it is preferred that the distance CD from each of the high frequency generators 210, 220 and 230 to a corresponding one of the first reflecting portions 311 and 312 be n/2*λ, where n is a natural number ranging from 1 to 12, and λ is the wavelength of high frequency waves generated by the high frequency generators. More preferably, the distance is 2λ.

In addition, the distance ② from the substrate 100 to the first reflecting portions 311 and 312 can be 4 cm, preferably, 2 cm.

In addition, when the plurality of high frequency generators 240, 250 and 260 is arranged in a plurality of rows, the first reflecting portions 311 and 312 can partition the rows of the high frequency generators 240, 250 and 260. Here, the rows of the high frequency generators 240, 250 and 260 can be formed in the direction from left to right.

In this fashion, the first reflecting portions 311 and 312 are respectively formed between the adjacent rows of the high frequency generators 240, 250 and 260. The first reflecting portions 311 and 312 prevent high frequency waves generated by the individual rows from interfering with each other, thereby preventing electric fields from being concentrated, so that the substrate 100 is not locally heated by the concentrated electric fields.

The reflector 300 according to this embodiment can include reflecting portions 321 and 322 which are disposed on the left side and/or the right side of the high frequency generator 200.

When the high frequency heating apparatus according to this embodiment includes the plurality of high frequency generators 240, 250 and 260 which are arranged in at least one row, the second reflecting portions 321 and 322 can be disposed on the left side and/or the right side of the row of the high frequency generators.

In addition, the second reflecting portions 321 and 322 can extend in the direction from the front to the rear.

In order to efficiently reflect high frequency waves generated by the plurality of high frequency generator 200, it is preferred that the distance ③ from the high frequency generator 200 to the second reflector 321 or 322 be 2λ or less.

Figure 5:
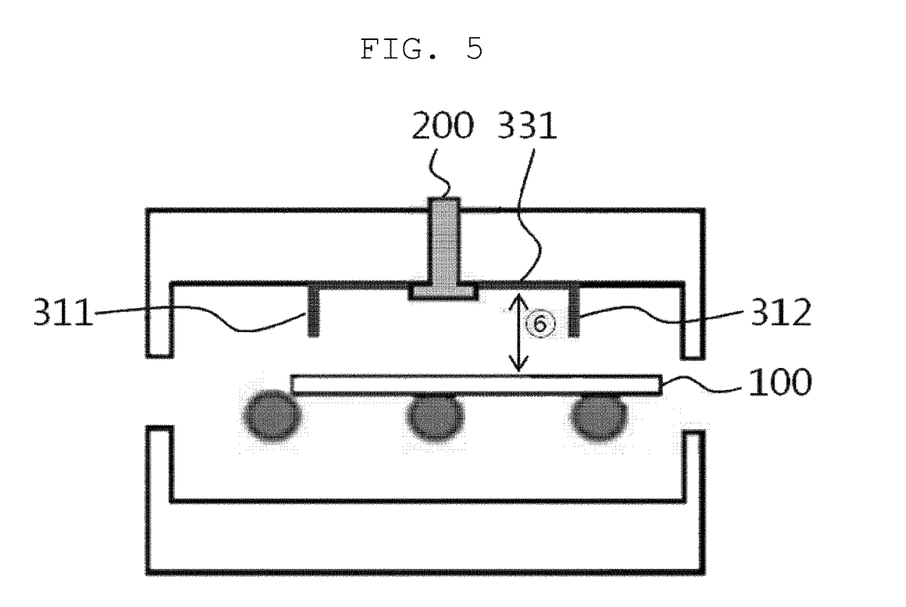
FIG. 5 is a schematic side elevation view showing a high frequency heating apparatus according to further another embodiment of the present invention.

In addition, as shown in FIG. 5, the reflector 300 according to this embodiment can include a third reflecting portion 331 which is disposed above and/or below the substrate 100 in order to more efficiently reflect high frequency waves. The third reflecting portion 331 is formed such that the main plane thereof faces the main plane of the substrate 100.

The distance from the third reflecting portion 331 to the substrate 100 can be n/2*λ, where n is a natural number ranging from 1 to 6. Preferably, the distance is λ.

Figure 6:
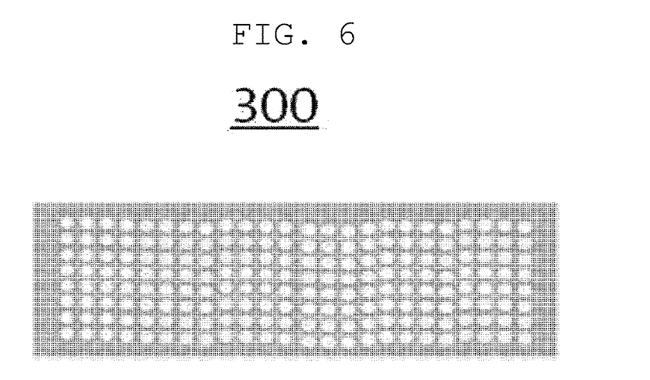
FIG. 6 is a schematic configuration view showing a reflector according to an embodiment of the present invention.

In addition, as shown in FIG. 6, the reflector 300 according to the present invention can have a number of holes in order to facilitate air convection, thereby increasing the heating efficiency. The diameter of the holes can be 3 mm or less in order to prevent high frequency waves from leaking outside of the reflector 300 through the holes without being reflected. Preferably, the diameter of the holes can be 2 mm.

Figure 7A:
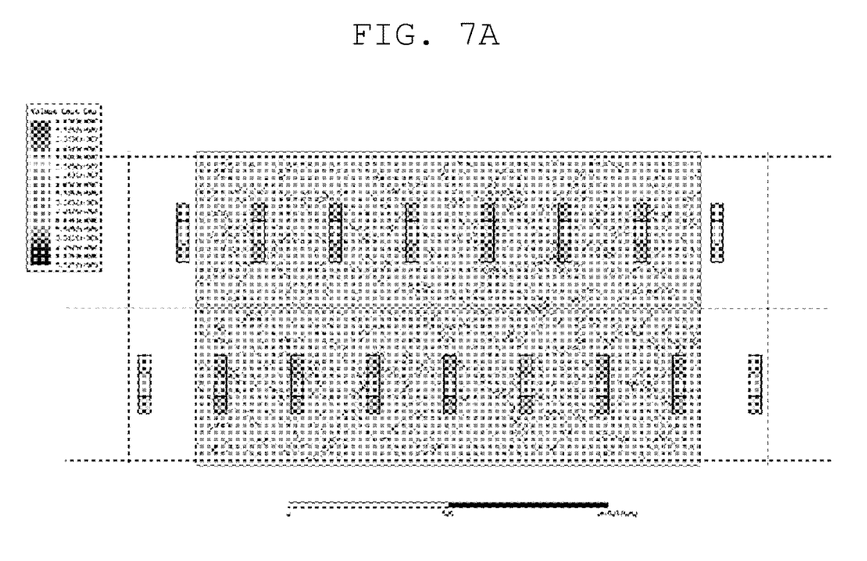
FIG. 7A and FIG. 7B are pictures of electric field distribution analysis and temperature distribution analysis that are measured after heating a piece of glass using a high frequency heating apparatus according to an embodiment of the present invention.
Figure 7B:
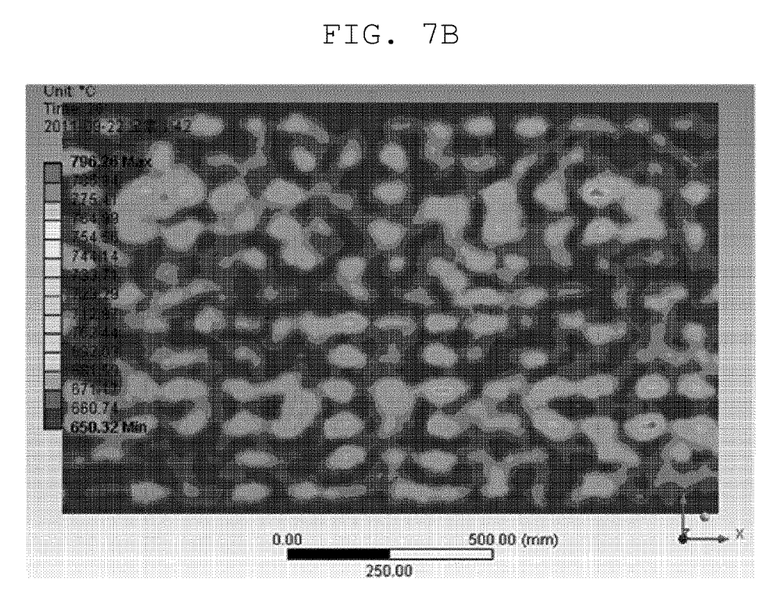

FIG. 7A and FIG. 8B are pictures of electric field distribution analysis and temperature distribution analysis that are measured after heating a piece of glass using a high frequency heating apparatus which includes two rows of high frequency generators and a reflector according to an embodiment of the present invention. As shown in FIG. 7A and FIG. 7B, it can be appreciated that, when the glass is heated using the high frequency heating apparatus having the two rows of high frequency generators, the reflector prevents high frequency waves generated by the individual rows of high frequency generators from interfering with each other so that the electric field distribution can be maintained to be equal to that of the high frequency heating apparatus having one row of high frequency generators and the substrate can be uniformly heated.

Figure 8:
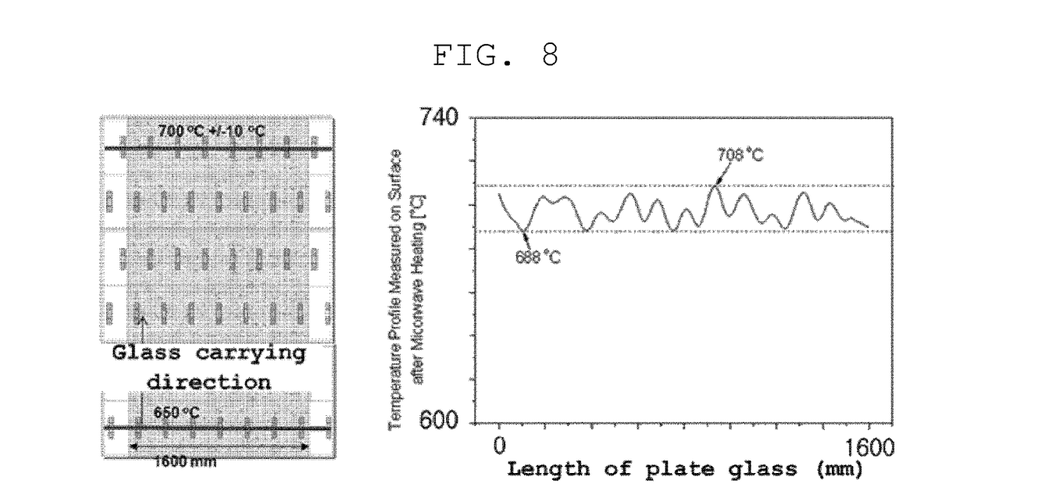
FIG. 8 is a graph showing surface temperatures of a plate glass that are measured after the plate glass is carried to a high frequency heating apparatus according to an embodiment of the present invention.

FIG. 8 is a graph showing surface temperatures of a plate glass that are measured after the plate glass having a width of 1600 mm is carried to and is heated to 650° C. by a high frequency heating apparatus which includes a plurality of rows of high frequency generators and a reflector according to an embodiment of the present invention.

As shown in FIG. 8, it can be appreciated that the plate glass was very uniformly heated using the high frequency heating apparatus according to the present invention such that the distribution of the surface temperature thereof is 700° C.±10° C.

In addition, the high frequency heating apparatus according to the present invention can also include a heater (not shown) which heats the substrate, in addition to the high frequency generators.

The heater (not shown) heats the substrate from outside to inside by generating heat through electrical resistance, and the high frequency generators vibrate ions inside the substrate using high frequency waves and heat the inside and outside of the substrate using resultant frictional heat. In this fashion, the substrate can be more efficiently heated.

The foregoing descriptions of specific exemplary embodiments of the present invention have been presented with respect to the certain embodiments and drawings. They are not intended to be exhaustive or to limit the invention to the precise forms disclosed, and obviously many modifications and variations are possible for a person having ordinary skill in the art in light of the above teachings.

It is intended therefore that the scope of the invention not be limited to the foregoing embodiments, but be defined by the Claims appended hereto and their equivalents.

What is claimed is:

1. A high frequency heating apparatus comprising a plurality of high frequency generators disposed over a glass substrate to be carried in a first direction and spaced apart from each other in the first direction, each of the plurality of high frequency generators generating high frequency to heat the glass substrate, the high frequency ranging from 0.98 GHz to 6.0 GHz, wherein a distance from the glass substrate to each of the plurality of high frequency generators is $(n'/2)*\lambda$, where n' is a natural number ranging from 1 to 6, and $\lambda$ is a wavelength of the high frequency.

2. The high frequency heating apparatus of claim 1, wherein the plurality of high frequency generators are respectively arranged at distances expressed by $(n''/2)*\lambda$, where n'' is a natural number ranging from 1 to 12.

3. A high frequency heating apparatus comprising a plurality of high frequency generators disposed over a glass substrate to be carried in a first direction and spaced apart from each other in the first direction, each of the plurality of high frequency generators generating high frequency to heat the glass substrate, the high frequency ranging from 0.98 GHz to 6.0 GHz, wherein the plurality of high frequency generators are arranged at distances expressed by $(n''/2)*\lambda$, where n'' is a natural number ranging from 1 to 12, and $\lambda$ is a wavelength of the high frequency.

4. The high frequency heating apparatus of claim 1, further comprising a reflector which reflects the high frequency toward the glass substrate.

5. The high frequency heating apparatus of claim 4, wherein the reflector partitions the plurality of high frequency generators into groups each including at least one high frequency generator of the plurality of high frequency generators.

6. The high frequency heating apparatus of claim 5, wherein the reflector comprises a first reflecting portion which forms a partition between the plurality of high frequency generators.

7. The high frequency heating apparatus of claim 6, wherein
the plurality of high frequency generators comprises at least one row of high frequency generators arranged in a second direction intersecting the first direction.

8. The high frequency heating apparatus of claim 6, wherein a distance from each of the plurality of high frequency generators to the first reflecting portion is $(n''/2)*\lambda$, where n'' is a natural number from 1 to 12.

9. The high frequency heating apparatus of claim 6, wherein a distance from the glass substrate to the first reflecting portion is 4 cm or less.

10. The high frequency heating apparatus of claim 4, wherein the reflector comprises a second reflecting portion which is disposed on at least one of a left side and a right side of the plurality of high frequency generators, a direction from the left side to the right side defining a second direction intersecting the first direction.

11. The high frequency heating apparatus of claim 10, wherein a distance from the plurality of high frequency generators to the second reflecting portion is $2\lambda$ or less.

12. The high frequency heating apparatus of claim 10, wherein
the plurality of high frequency generators comprises at least one row of high frequency generators arranged in the second direction.

13. The high frequency heating apparatus of claim 4, wherein the reflector comprises a third reflecting portion which is disposed at least one of above and below the glass substrate, a main plane of the third reflecting portion facing a main plane of the glass substrate.

14. The high frequency heating apparatus of claim 13, wherein a distance from the third reflecting portion to the glass substrate is $(n''''/2)*\lambda$, where n'''' is a natural number ranging from 1 to 6.

15. The high frequency heating apparatus of claim 4, wherein the reflector surrounds the plurality of high frequency generators from a front and a rear in the first direction, and from a left side and a right side in a second intersecting the first direction.

16. The high frequency heating apparatus of claim 4, wherein the reflector is disposed at corresponding positions that are above and below the glass substrate.

17. The high frequency heating apparatus of claim 4, wherein the reflector has a plurality of holes.

18. The high frequency heating apparatus of claim 17, wherein a diameter of the holes is 3 mm or less.

* * * * *